United States Patent [19]
Sperry et al.

[11] Patent Number: 5,996,782
[45] Date of Patent: *Dec. 7, 1999

[54] FOAM IN BAG PACKAGING SYSTEM FOR MANUAL USE

[75] Inventors: Laurence Burst Sperry; Anthony Orkin Davlin, both of Boston, Mass.; George Teofilius Bertram, Newtown, Conn.; Charles Paul Kannankeril, North Caldwell, N.J.

[73] Assignee: Sealed Air Corporation, Saddle Brook, N.J.

[ * ] Notice: This patent is subject to a terminal disclaimer.

[21] Appl. No.: 08/838,881

[22] Filed: Apr. 14, 1997

[51] Int. Cl.$^6$ ...................................................... B65D 81/03
[52] U.S. Cl. ........................................... 206/219; 206/524
[58] Field of Search .................................. 206/219, 524, 206/523, 221; 383/210

[56] References Cited

U.S. PATENT DOCUMENTS

| | | |
|---|---|---|
| 2,895,603 | 7/1959 | Freeman . |
| 3,073,507 | 1/1963 | Trewella et al. . |
| 3,190,442 | 6/1965 | Gauss . |
| 3,222,843 | 12/1965 | Schneider . |
| 3,229,936 | 1/1966 | Quillinan . |
| 3,307,318 | 3/1967 | Bauman . |
| 3,332,670 | 7/1967 | Swartz . |
| 3,419,134 | 12/1968 | Fitts . |
| 3,471,005 | 10/1969 | Sextone ................................. 383/210 X |
| 3,503,177 | 3/1970 | Kropscott et al. . |
| 3,543,966 | 12/1970 | Ryan et al. . |
| 3,570,375 | 3/1971 | Williams et al. . |
| 3,708,106 | 1/1973 | Sargent ................................. 383/210 X |
| 3,722,833 | 3/1973 | Inoue et al. . |
| 3,860,219 | 1/1975 | Nickerson, Jr. . |
| 3,892,060 | 7/1975 | Stanley, Jr. . |
| 4,002,289 | 1/1977 | Moore . |
| 4,049,242 | 9/1977 | Porter . |
| 4,057,047 | 11/1977 | Gossett . |
| 4,121,714 | 10/1978 | Daly et al. . |
| 4,145,449 | 3/1979 | Nelham . |
| 4,193,499 | 3/1980 | Lookholder . |
| 4,221,290 | 9/1980 | Bast . |
| 4,226,330 | 10/1980 | Butler . |
| 4,232,788 | 11/1980 | Roth . |
| 4,239,105 | 12/1980 | Gilbert . |
| 4,240,556 | 12/1980 | Field . |
| 4,256,256 | 3/1981 | Meyers . |
| 4,265,216 | 5/1981 | Marshall et al. . |
| 4,272,898 | 6/1981 | Tansill . |
| 4,273,689 | 6/1981 | Smearing . |
| 4,402,402 | 9/1983 | Pike ..................................... 206/221 X |
| 4,449,631 | 5/1984 | Levenberg et al. . |
| 4,449,970 | 5/1984 | Bevan et al. . |
| 4,458,811 | 7/1984 | Wilkinson ............................ 206/221 X |
| 4,467,588 | 8/1984 | Carveth . |
| 4,491,959 | 1/1985 | Loefberg . |
| 4,506,914 | 3/1985 | Gobeli . |
| 4,521,467 | 6/1985 | Berger . |
| 4,540,089 | 9/1985 | Maloney . |
| 4,557,377 | 12/1985 | Maloney . |

(List continued on next page.)

FOREIGN PATENT DOCUMENTS

| | | |
|---|---|---|
| 0 209 103 | 6/1989 | European Pat. Off. . |
| 0 243 750 | 7/1990 | European Pat. Off. . |
| 004301127 | 7/1994 | Germany . |
| 19545120 | 12/1995 | Germany . |

Primary Examiner—Jacob K. Ackun
Attorney, Agent, or Firm—Alston & Bird LLP

[57] ABSTRACT

A foam in bag cushion precursor is disclosed that is particularly useful for manual operation. The cushion precursor comprises a bag formed of two sheets of flexible plastic film material closed on all four side edges; a frangible seal that defines separate interior cells in a portion of the bag; a first foam precursor composition in one of the interior cells; and a second foam precursor composition in another of the interior cells. One of the cells has a nonfrangible seal wall other than one of the side edges for directing the contents of the cell to mix with the contents of the other cell before the mixed contents enter the remaining portion of said bag.

34 Claims, 3 Drawing Sheets

U.S. PATENT DOCUMENTS

| | | |
|---|---|---|
| 4,581,764 | 4/1986 | Plock et al. . |
| 4,620,633 | 11/1986 | Lookholder . |
| 4,631,905 | 12/1986 | Maloney . |
| 4,735,675 | 4/1988 | Metz . |
| 4,787,511 | 11/1988 | McIver . |
| 4,795,265 | 1/1989 | Dahlberg et al. . |
| 4,803,086 | 2/1989 | Hedenberg . |
| 4,823,985 | 4/1989 | Grollier et al. . |
| 4,845,923 | 7/1989 | Donovan . |
| 4,889,943 | 12/1989 | Kawamura et al. . |
| 4,932,155 | 6/1990 | Friemel et al. . |
| 4,949,529 | 8/1990 | Davis . |
| 5,009,311 | 4/1991 | Schenk . |
| 5,011,014 | 4/1991 | Borck et al. ........................ 383/210 X |
| 5,019,432 | 5/1991 | Kawamura et al. . |
| 5,020,831 | 6/1991 | Bernardelli . |
| 5,061,500 | 10/1991 | Mendenhall . |
| 5,098,228 | 3/1992 | Mauthe . |
| 5,233,981 | 8/1993 | Miyashita . |
| 5,304,056 | 4/1994 | Fetterhoff . |
| 5,316,209 | 5/1994 | Tomisawa et al. . |
| 5,348,984 | 9/1994 | Lee . |
| 5,401,264 | 3/1995 | Leise, Jr. . |
| 5,462,974 | 10/1995 | Lee . |
| 5,501,525 | 3/1996 | Cox et al. . |
| 5,536,356 | 7/1996 | Stuerzel . |
| 5,562,227 | 10/1996 | Takezawa et al. . |
| 5,699,902 | 12/1997 | Sperry et al. ........................... 206/219 |

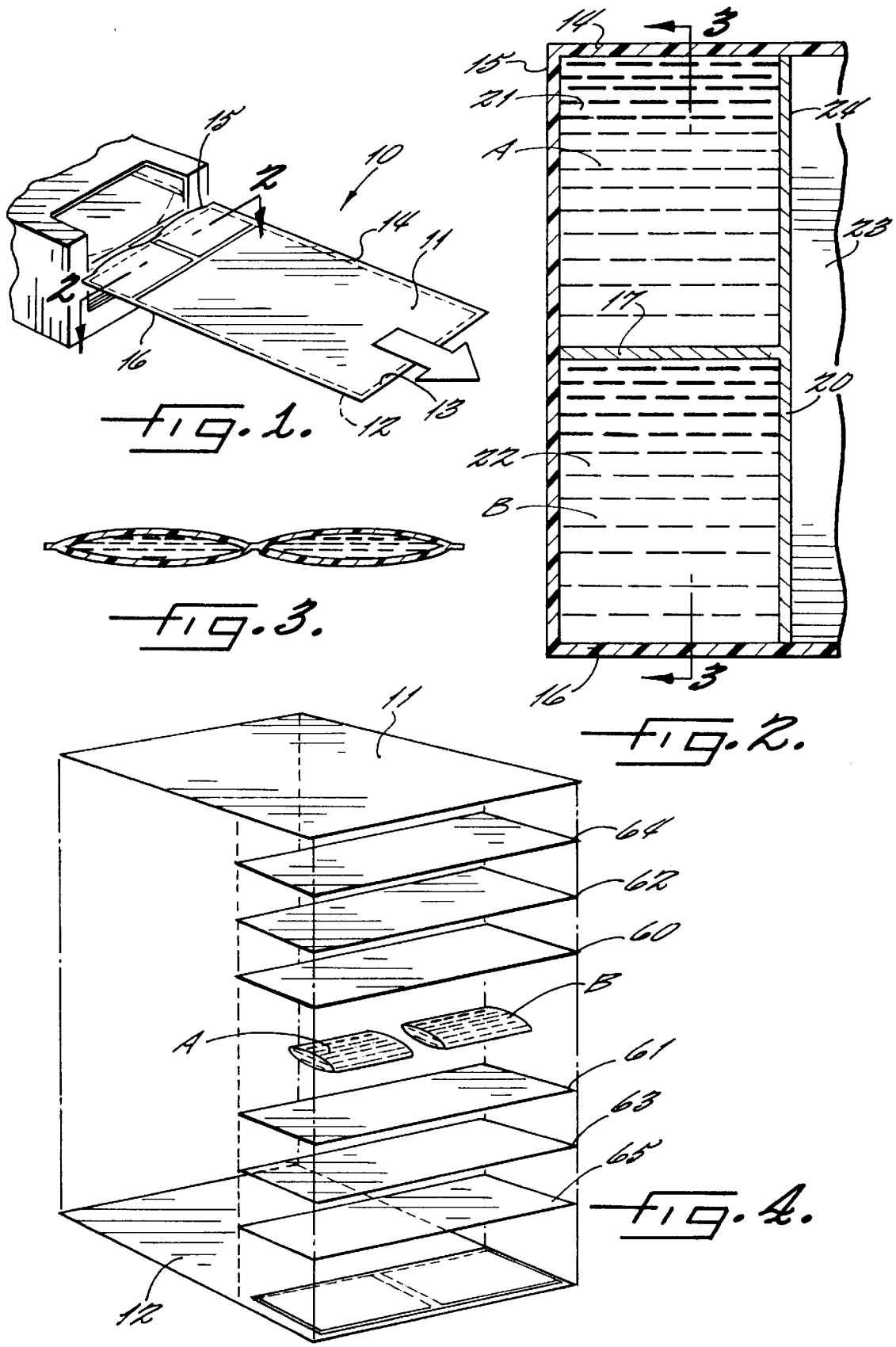

FOAM IN BAG PACKAGING SYSTEM FOR MANUAL USE

FIELD OF THE INVENTION

The present invention relates to foam-in-place packaging systems and in particular relates to the manufacture, structure, and use of bag cushion precursors that carry foamable compositions.

BACKGROUND OF THE INVENTION

The present invention relates generally to foam-in-place packaging. Foam-in-place packaging has been well known and widely used as a protective packaging method for a number of years. The underlying technology is based upon the reaction between two (usually liquid) chemicals that form a solid polymer while at the same time generating a gaseous by-product. In particular, when isocyanate compounds react with polyols and water, the reaction produces both a urethane polymer ("polyurethane") and carbon dioxide. Under proper conditions, the carbon dioxide generated by the reaction will bubble and disperse through the polymer as it hardens to thus form an expanded polymer foam that can be used as a protective material for packaging fragile objects. The process by which the liquid precursors mix as liquids and then expand as not-yet-hardened foam typically takes about 20–30 seconds, thus making feasible its manipulation and use for packaging purposes.

In a first generation of foam-in-place packaging, objects to be protected were placed into containers (e.g. corrugated boxes), and wrapped or draped with a protective material such as a plastic sheet. Thereafter, the polyol and isocyanate were pumped from separate supplies, mixed, and then injected from a gun-like dispenser into the container. If the amount of injected mixture was appropriate, the resulting foam would essentially fill the interior of the container while surrounding the object to provide a custom package. Such relatively straightforward injection practices are still useful in many applications, and an updated injection device is disclosed, for example, in copending and commonly assigned application Ser. No. 08/361,322 filed Dec. 21, 1994 for "Hand Held Dispenser for Foamable Compositions and Dispensing System."

In a next generation of foam-in-place packaging, devices have been developed which concurrently produce plastic bags and fill them with the foamable mixture of polymer precursors. The bag has a vent to permit the carbon dioxide to escape. A packaging operator can simply drop one or more newly made bags into a container carrying an object to be packaged, and then close the container. The foam in the bag continues to generate and expand until it likewise fills the interior of the container while forming a custom-shaped cushion around the object packaged therein. Such bag making systems provide the advantage of injecting the foam into a bag that is immediately closed, rather than requiring the operator to manually dispense the foam. As is known to those familiar with such foamable chemicals, they tend to be extremely messy and, if not controlled properly, can cause problems which slow or stop the entire packaging process until the unwanted foam residue can be cleaned up. In more serious circumstances, the foam can even cause its handling machinery to break down leading to further additional delays.

Examples of foam-in-place devices are described in a number of patents and copending applications that are commonly assigned with the present invention. These include inter alia, U.S. Pat. Nos. 4,800,708; 4,854,109; 4,938,007; 5,027,583; 5,139,151 and 5,376,219 and pending applications Ser. Nos. 08/121,751, filed Sep. 15, 1993 and 08/514,010 filed Aug. 11, 1995.

The packaging requirements of various users can, however, differ widely. Thus, any particular given foam-in-place system may not be appropriate or economically viable for every potential user. For example, users who repetitively use foam cushions on a large volume basis are probably most appropriately served by one of the more sophisticated devices such as those described in U.S. Pat. Nos. 5,376,219 or 4,800,708. For less frequent users, the smaller and more compact devices such as that illustrated in pending applications Ser. Nos. 08/121,751 and 08/514,010 may be appropriate, and as mentioned above, some users still prefer the simplest technique of using an injection system with a gun type device that dispenses the foam.

Nevertheless, the market has lacked any foam-in-place packaging system for the user who would otherwise like to take advantage of foam-in-place packaging, but has neither the desire nor the facilities to incorporate any one of the previous mentioned foam-in-bag systems. Accordingly, it has been considered desirable to manufacture a bag in which the foam precursors are separately maintained during storage so that in use, the packaging operator can simply take one of the bags, mix the ingredients by hand (i.e. handle the bag's exterior while mixing the precursors inside), and then place the expanding bag of foam into a package for purposes identical to those just described.

Attempts at making such bags have, however, been generally unsuccessful for reasons that are best illustrated by U.S. Pat. No. 3,419,134 to Fitts, and U.S. Pat. No. 4,232,788 to Roth.

Fitts '134 discloses several variations of a foamable package and a method for forming cellular foam in which the foam precursors are always placed in two separate smaller bags, and in one version of which are placed inside a larger bag. According to Fitts, there are rupturable "partitions" or "walls" between the bags, so that when the operator physically breaks the partitions, the chemicals will mix and form foam. The Roth '788 disclosure is essentially the same from a conceptual standpoint. Each of these suffer from some significant disadvantages, however, and essentially neither has appeared on the marketplace in any significant presence.

More recently, however, a more acceptable foam-in-bag cushion precursor has been developed, and the same is described in copending application Ser. No. 08/626,981 filed Apr. 3, 1996 for "Foam-in-Bag Packaging System," which is commonly assigned with the present invention and which is incorporated entirely herein by reference. As set forth therein, an appropriate combination of materials can provide a useful cushion precursor that carries the foamable compositions in separate portions until intentionally mixed by the end user.

The nature of the cushion precursors described in the '981 application are such that they encourage—and favorably so—the end user to manipulate a cushion precursor to thereby break the intended interior seals and thus initiate the foamforming process. This convenience, however, raises additional considerations. One such consideration is the heat generated by the foam-forming reaction, and copending application Ser. No. 08/834,636, filed concurrently herewith for "Thermally Insulated Foam In Bag Cushions," addresses this point, and this application is incorporated entirely herein by reference.

More specifically, the '981 application describes such bags whose interior seals (dividing foam precursors from each other and from the remainder of the bag) are entirely frangible for use in conjunction with mechanical mixing devices. These devices, even though mechanically simple and inexpensive, nevertheless insure that the separate foam-forming components (usually isocyanates and polyols as noted above) are quickly and thoroughly mixed, thus leading to a complete chemical reaction, elimination of undesired unused starting materials, and a high quality foam.

If the '981 cushion precursors are mixed by hand rather than machine, however, the possibility exists that the user will fail to mix the components as thoroughly as would the machine. Ideally, when using the '981-type cushion precursors, the separate foam precursors (often referred to as the "A" and "B" components) are mixed before they have the opportunity to expand into the empty remainder of the bag. When a '981-type bag is hand-mixed, however, the user may break the frangible seals—which offer significant advantages in many circumstances—in an undesired sequence. As a result, separate and unmixed portions of the A and B components can escape into the remainder of the bag, thus raising the possibility that an incomplete reaction will result, with its related disadvantages.

Therefore, there exists the need for a foam-in-place bag system which the end user can keep in shelf storage for an appropriate period of time and which, when it is to be used, can be manually internally ruptured to give a complete mixing of the foam precursors—even in the absence of machine mixing—that eliminates precursor residue and allows proper expansion of the foam in order to form a structurally appropriate packaging cushion.

OBJECT AND SUMMARY OF THE INVENTION

Therefore, it is an object of the present invention to provide a foam-in-bag cushion precursor that is particularly useful for manual operation and that encourages the production of high quality foam while eliminating undesired residue from the unreacted precursors.

The invention meets this object with a foam-in-bag cushion precursor that comprises a flexible bag closed on all of its side edges. A frangible seal defines separate interior cells in a portion of the bag, with a first foam precursor in one of the interior cells and a second foam precursor in the other of the interior cells. One of the cells has a nonfrangible seal wall other than one of the side edges for directing the contents of the cell to mix with the contents of the other cell before the mixed contents enter the remaining portion of the bag.

The foregoing and other objects, advantages and features of the invention, and the manner in which the same are accomplished, will be more readily apparent upon consideration of the following detailed description of the invention taken in conjunction with the accompanying drawings, which illustrate preferred and exemplary embodiments, and wherein:

DESCRIPTION OF THE DRAWINGS

FIG. 1 is a perspective view of a cushion precursor according to the present invention;

FIG. 2 is a cross-sectional view taken along lines 2—2 of FIG. 1;

FIG. 3 is a cross-sectional view taken along lines 3—3 of FIG. 2;

FIG. 4 is an exploded view of one embodiment of the bag's construction;

DETAILED DESCRIPTION OF THE PREFERRED EMBODIMENTS

Figure 5:
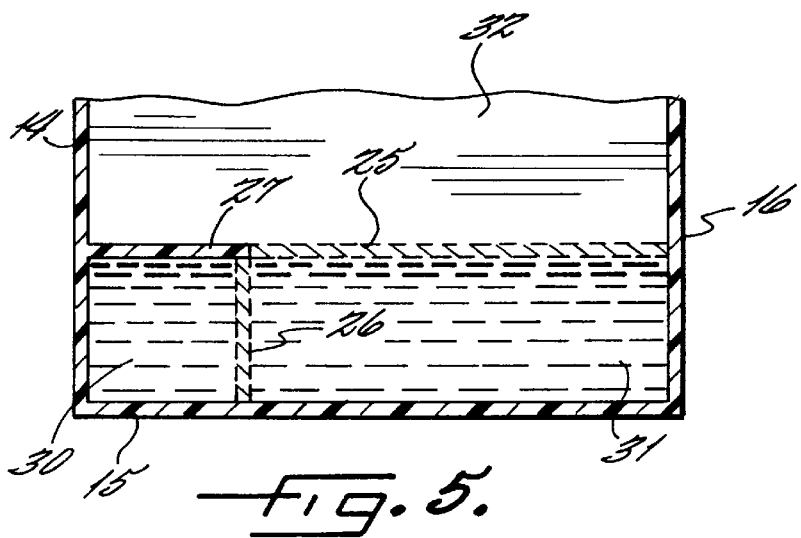
FIG. 5 is a partial cross-sectional view of a second embodiment of the invention.

The present invention is a foam-in-bag precursor that is particularly useful for manual operation. A first embodiment of a flexible bag closed on its side edges is broadly designated at 10 in FIG. 1. In its most typical construction, the bag 10 is formed of two sheets 11 and 12 of flexible plastic film material closed on four side edges. It will be understood that the two sheets can be arranged several ways; i.e. as two separate sheets, as one sheet center-folded to present two sheets, or as a flattened tube.

There are a number of materials that are suitable for the bag, including paper, and woven and nonwoven textiles. Preferred materials include various thermoplastic polymers, with polyolefins such as polyethylene being most preferred because of their combination of light weight, strength, flexibility, heat sealing capability, and generally low cost. A wide variety of thermoplastic sheet materials are commercially available, and their various properties are well known to those of ordinary skill in the art. For example, antistatic properties are considered useful or necessary in certain packaging applications and these can be incorporated into the plastic film (or other materials) in any manner that is otherwise compatible with the plastic film, the foam precursors, or the resulting foam. Additionally the properties of many specific plastics are widely published by their respective manufacturers. Thus, such materials will not be discussed in detail herein other than as necessary to describe the invention.

FIG. 1 illustrates that the bag 10 is closed on all four side edges 13, 14, 15, and 16. As described in the above incorporated patents and applications, one or more of the closed edges can comprise folded edges and one or more can comprise sealed edges. For example, if the bag 10 is originally formed from two separate sheets of plastic film material, the four edges 13, 14, 15, and 16 will all be sealed edges. As noted above, thermoplastic bag materials are preferably heat sealed, although the use of other adhesives or mechanical closures (e.g. clips such as the "divider assembly" in U.S. Pat. No. 3,332,670) as desired or necessary is within the scope of the present invention.

Alternatively, such bags are sometimes formed from a single sheet of material that is center-folded so that the fold forms one of the closed edges, with the remaining three edges being sealed edges, again typically heat sealed edges.

It will be understood that for purposes of clarity, the bags are illustrated in an idealized, pillow-like shape. In use, of course, the bags conform to their surroundings, as is their particular advantage.

The bag 10 includes at least one, and more preferably two, frangible seals that are best illustrated in FIG. 2 at 17 and 20. As used herein, the term frangible designates a seal that has sufficient integrity to avoid breakage during storage and normal handling, but that can be intentionally separated when desired without undue effort, and without rupturing or tearing the plastic sheets 11 or 12. As used herein, the term "frangible seal" can also include certain mechanical sealing devices such as clip seals that can be used to separate and seal the foam precursors and can then be removed in a manner functionally equivalent to rupturing frangible seals.

Figure 7:
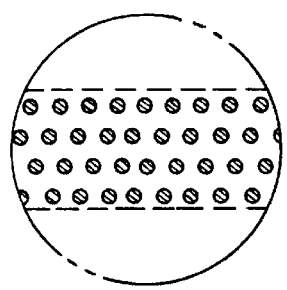
FIG. 7 is an enlarged view of a portion of FIG. 6.

A further discussion of the frangible seals and their nature is set forth in the above-referenced '981 application. As an additional improvement in the present invention, however the frangible seal is preferably formed of a pattern of printed ink (FIG. 7) that prevents the thermoplastic film from heat sealing at an inked portion, so that the amount of inked portions in the ink pattern determine the strength of the frangible seal. In the preferred embodiment, the relationship between the ink pattern and the seal strength is inversely proportional; i.e. the greater the amount of ink in the pattern, the weaker the seal, and the lesser the amount of ink in the pattern, the stronger the seal.

As another possibility and as discussed in the '981 application, other adhesives can be applied in a desired pattern, or sealed at a certain temperature (such as with a layer of an ionomer), to define seal strength in a directly proportional fashion; i.e. more adhesive or higher temperature creates a stronger seal, while less adhesive or lower temperature produces a weaker seal. The use of ink, however, provides several advantages, including in most circumstances the capability of being more precisely controlled in its application than can typical adhesives, thus offering a similarly increased control over the precise strength of the desired seal. As an example, U.S. Pat. No. 3,570,375 to Williams et al., the contents of which are incorporated entirely herein by reference, notes that certain polyimide-based inks are useful for such heat-seal inhibiting properties.

It will be understood that the term "ink" is used in a descriptive, rather than limiting, sense. Other release agents such as coatings or treatments can be suitably incorporated as well. Such agents are generally well-known in the art and can be selected without undue experimentation. The printed release agent technique is cost-effective and can be used with stock polyethylene (or other conventional polymers) as the bag material. The technique also permits a single sealing die to produce both the frangible and nonfrangible portions of one or more seals.

In some presently preferred embodiments, the ink pattern is formed of 0.5, 0.75 or 1 point dots, typically separated from one another by about 0.06 inches in a hexagonal pattern. Another preferred pattern is formed of a cross-hatch of lines that are about 4–6 mils wide and about ⅛ to 3/16 inch apart at a 45° angle.

Accordingly, it will be understood that in another embodiment the bag 10 can be described as being formed of overlying sheets of thermoplastic film material with a frangible seal that divides the bag into at least two portions, the seal being formed of a pattern of printed ink in which the ink prevents the thermoplastic film from heat sealing at an inked portion, so that the amount of inked portions in the ink pattern determine the strength of the frangible seal. The seals 17 and 20 define at least two cells in the bag 10 which are designated at 21 and 22 in FIG. 2, and in preferred embodiments the seals also define a third interior cell 23 which in most circumstances is the cell into which the foam expands after the components are mixed The first foam precursor A is in the first cell 21, and the second foam precursor B is in the second interior cell 22.

One of the cells, which in FIG. 2 is the first cell 21, also has a nonfrangible cell wall 24 which in the illustrated embodiment is other than one of the side edges 14, 15, or 16. The nonfrangible cell wall 24 directs the contents A of the first cell 21 to mix with the contents B of the second cell 22 before the mixed contents enter the remaining portion of the bag 23. Stated differently, the nonfrangible seal 24 remains intact when the bag 10 is intentionally manipulated to rupture the frangible seals 17 or 20, whether by hand or by machine. As a result, the A component in the first cell 21 is initially limited in its path of travel to the second cell 22 where it must mix, to some greater or lesser extent, with the B component before it can exit into the remainder of the bag 23.

Thus, in the embodiment illustrated in FIGS. 1 and 2, the nonfrangible seal 24 separates the first cell 21 from the third cell 23, and the frangible cell 17 separates the first cell 21 from the second cell 22 so that breaking the frangible seal 17 directs the contents A of the first cell 21 to mix with the contents B of the second cell 22 before entering the third cell 23.

Figure 6:
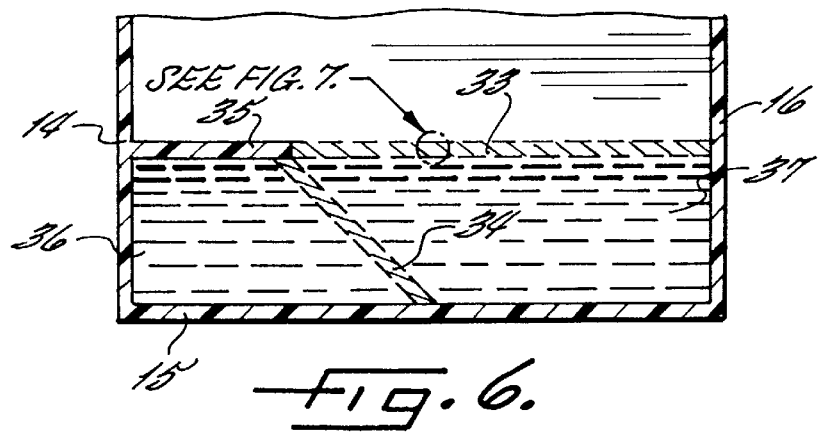
FIG. 6 is a partial cross-sectional view of a third embodiment of the present invention.

FIGS. 5 and 6 illustrate other aspects of the invention. First, in FIG. 5 the edges of the bag 10 are again designated at 14, 15, and 16. The two frangible seals are designated at 25 and 26, and the nonfrangible seal at 27. In FIG. 2, the first and second cells 21 and 22 are substantially the same size. In the embodiment illustrated in FIG. 5, however, the positions of the seals 25, 26 and 27 define the respective sizes of the first cell 30 and the second cell 31 as those that hold the correct proportion of each respective foam precursor to encourage complete reaction between the precursors.

Furthermore, the seals 25, 26 and 27, taken in conjunction with the amounts of plastic material and foam precursors selected to make the bag, can be used to define the size of the third cell 32 as that which will contain the amount of foam generated by the precursors in the cells 30 and 31 without using excess plastic film material. It will be understood, of course, that the respective cell sizes need not exactly match the volume of precursors or finished foam. In the most common technique, the precursor volume (i.e. of the chemical rather than the cell) is selected to produce a final cushion of a desired predetermined size.

FIG. 6 illustrates yet another embodiment in which the frangible seals are designated at 33 and 34 and the nonfrangible seal at 35. In both FIGS. 5 and 6, the overall bag is rectangular in shape, and the four side edges 13 (not shown), 14, 15, and 16 comprise two sets of parallel edges; e.g. 13 and 15 and 14 and 16; with the sets being perpendicular to one another. Furthermore, in FIGS. 2, 5, and 6, at least one of the frangible seals is parallel to one of the side edges, and more particularly, in FIG. 2 one frangible seal 20 is parallel to side edge 15 while the other frangible seal 17 is parallel to side edges 16 and 14. FIG. illustrates a similar relationship in which one frangible seal 25 and the nonfrangible seal 27 are parallel to side edges 13 and 15, while the other frangible seal 26 is parallel to side edges 14 and 16.

In the embodiments of FIG. 2 and FIG. 5, the frangible seals (17, 20; 25, 26) are perpendicular to one another, while in the embodiment shown in FIG. 6, the frangible seals 33 and 34 are oblique to one another. The oblique seal also can minimize the length of the nonfrangible seal, which can be an advantage in certain circumstances.

Thus, in the embodiments illustrated in FIGS. 2, 5, and 6, each respective first cell (21, 30 or 36) is defined by portions of two (14, 15) of the four side edges along with one frangible seal (17, 26 and 34 respectively) and one nonfrangible seal (24, 27, and 35 respectively). In turn, the second cell (22, 31 and 37 respectively) is defined by portions of two (15, 16) of the four side edges and two frangible seals (17 and 20; 25 and 26; or 33 and 34 respectively).

Figure 8:
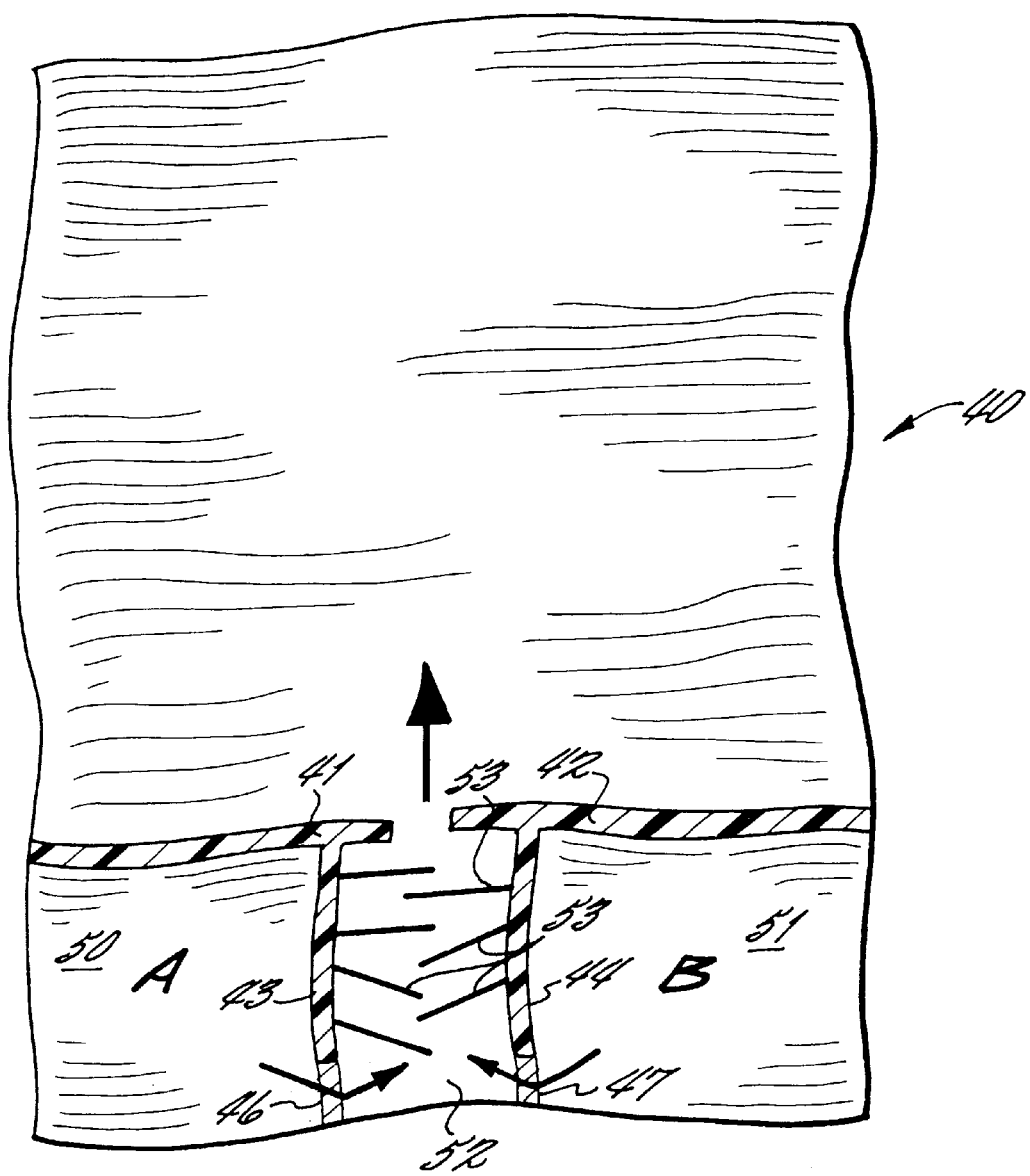
FIG. 8 is a plan view of a fourth embodiment of the cushion precursor of the present invention.

FIG. 8 discloses yet another embodiment of the bag broadly designated at 40. The bag 40 comprises a plurality of interior seals illustrated at 41, 42, 43, and 44 which, together with frangible seals 46, and 47, define the interior cell structure of the bag 40.

In the embodiment illustrated in FIG. 8, the seals define noncontiguous cells 50 and 51 for the A and B components respectively. The cells 50 and 51 are adjacent a mixing pathway 52 that includes a plurality of discontinuous seal lines 53 that separate the cells 50, 51 from the remaining portion of the bag and that direct the foam precursors A and B to mix in the pathway 52 prior to expanding into the remaining portion of the bag 40.

FIG. 4 is an exploded view of one embodiment of the invention which particularly illustrates the detailed construction of the cells that hold the foam precursors. For the sake of clarity, the reference numerals of FIG. 4 will be the same as those of FIGS. 1, 2 and 3. FIG. 4 illustrates that the bag is primarily formed of top and bottom layers 11 and 12 of plastic film material, preferably polyethylene. The portions of the cells 21 and 22 that contact the components A and B are formed of cell-sized sheets of polyethylene 60 and 61 respectively which are in turn adjacent to (or in some cases coated with), a metal foil layer 62 and 63, respectively. As set forth in the incorporated '981 application, the foil provides a vapor transmission barrier that gives long term stability to the structures and to the enclosed foamable compositions.

The illustrated embodiment also includes two polyester layers 64 and 65 that add mechanical strength to the overall structure and help protect the metal layers 62 and 63. Additionally, because polyester's melting point is higher than polyethylene's, the polyester layers can withstand the typical heat sealing temperatures applied to polyethylene.

As in other applications of foam-in-bag structures and manufacture, bags formed according to the present invention include means for permitting gases to vent to and from the bag as the foam precursors form foam. As described in several of the aforementioned patents and pending applications, such venting means often comprises a puncture opening in at least one sheet of a plastic film material, or an unsealed portion in an otherwise sealed edge of the bag. Additionally, as set forth in U.S. Ser. No. 08/843,275 filed concurrently herewith for "Gas Permeable Foam-In-Bag Cushions" the venting means can be formed of a material that is permeable to gases but that substantially prevents the passage of the foam and the foamable compositions. This application is incorporated entirely herein by reference.

In the drawings and specification, there have been disclosed typically preferred embodiments of the invention, and although specific terms have been employed, they have been used in a generic sense and in a descriptive sense only, and not for purposes of limitation, the scope of the invention being set forth in the following claims.

That which is claimed:

1. A foam in bag cushion precursor that is particularly useful for manual operation, said cushion precursor comprising:
    a flexible bag closed on all of its side edges and defining an interior space to receive foam therein, said bag having at least its inner surfaces formed of a heat sealable plastic material;
    a plurality of seals defining first and second separate interior cells in a portion of said bag, one of said seals being frangible and located between said first and second cells and another of said seals being frangible and located between said second cell and said interior space within said bag while the remainder of said seals are non-frangible, said frangible seals being formed over a pattern of printed release agent in which said agent prevents said plastic material from heat sealing at a printed portion, so that the amount of printed portions in said pattern determines the strength of said frangible seals;
    a first foam precursor composition in said first interior cell;
    a second foam precursor composition in said second interior cell;
    the frangible seal between said first and second cells being adapted for manual rupturing to provide communication between the formerly separate cells and the nonfrangible seals serving for directing the contents of said first cell to mix with the contents of said second cell before the mixed contents enter the remaining portion of said bag; and
    means for permitting gases to vent from said bag as the foam precursors form foam.

2. A foam in bag precursor according to claim 1 wherein:
    said cells are adjacent a mixing pathway; and
    said mixing pathway is formed of a plurality of discontinuous seal lines that separate said cells from said remaining portion of said bag for directing said foam precursors to mix in said pathway prior to expanding into the remaining portion of said bag.

3. A foam in bag precursor according to claim 1 wherein said venting means is selected from the group consisting of: a puncture opening in at least one sheet of said plastic film material, an unsealed portion in an otherwise sealed edge of said bag, and a portion of said bag formed of a material that is permeable to gases, but that substantially prevents the passage of foam and foam precursors.

4. A foam in bag precursor according to claim 1 wherein one of said closed side edges is a folded edge.

5. A foam in bag precursor according to claim 1 wherein one of said closed side edges is a sealed edge.

6. A foam in bag precursor according to claim 1 wherein said bag material has insulating characteristics that sufficiently moderate the transfer of the heat generated by the reaction of foam precursors to keep the temperature on the outer surface of the bag below the expected pain threshold for human touch as the foam precursors react to form foam.

7. A foam in bag precursor according to claim 1 wherein said nonfrangible seal is a mechanical seal.

8. A foam in bag precursor according to claim 1 wherein said nonfrangible seal is other than one of said side edges.

9. A foam in bag cushion precursor that is particularly useful for manual operation, said cushion precursor comprising:
    a bag formed of overlying sheets of thermoplastic film material defining a closed interior space therebetween;
    a frangible seal dividing said interior space in said bag into at least two portions, said seal being formed over a pattern of printed release agent in which said agent prevents said thermoplastic film from heat sealing at a printed portion, so that the amount of printed portions in said pattern determines the strength of said frangible seal and said frangible seal being susceptible to manual rupturing; and
    first and second foam precursor compositions in said two portions of said bag which when mixed upon rupture of said frangible seal forms a foamable composition in said bag.

10. A foam in bag precursor according to claim 9 and further comprising a nonfrangible seal wall for directing said first and second precursor compositions to mix with one another before the foamable composition enters the remaining portions of said bag.

11. A foam in bag precursor according to claim 10 wherein said nonfrangible seal wall is other than one of said side edges.

12. A foam in bag precursor according to claim 9 and further comprising means for permitting gases to vent to and from said bag as the foam precursors form foam.

13. A foam in bag precursor according to claim 12 wherein said venting means is selected from the group consisting of: a puncture opening in at least one sheet of said plastic film material, an unsealed portion in an otherwise sealed edge of said bag, and a portion of said bag formed of a material that is permeable to gases, but that substantially prevents the passage of foam and foam precursors.

14. A foam in bag precursor according to claim 9 wherein said bag includes four closed edges and wherein one of said closed side edges is a folded edge.

15. A foam in bag precursor according to claim 9 wherein said bag includes four closed edges and wherein one of said closed side edges is a sealed edge.

16. A foam in bag precursor according to claim 9 wherein said bag material has insulating characteristics that sufficiently moderate the transfer of the heat generated by the reaction of foam precursors to keep the temperature on the outer surface of the bag below the expected pain threshold for human touch as the foam precursors react to form foam.

17. A foam in bag precursor that is particularly useful for manual operation, said cushion precursor comprising:

a bag formed of two sheets of flexible plastic film material closed on all four side edges and defining an interior space for receipt of foam, a plurality of seals dividing said interior space in said bag into respective first, second and third separate cells, said first cell being separated from said second cell by a first frangible seal susceptible to manual rupture and from said third cell by a nonfrangible seal and said second cell being separated from said third cell by a second frangible seal susceptible to rupture by expansion of foam, said frangible seals being formed over a pattern of printed release agent in which said agent prevents said plastic material from heat sealing at a printed portion, so that the amount of printed portions in said pattern determines the strength of said frangible seals;

a first foam precursor composition in said first cell;

a second foam precursor composition in said second cell;

said nonfrangible seal of said first cell directing the first foam precursor composition to mix with the second foam precursor composition in said second cell before the mixed precursor compositions enter said third cell; and means for permitting gases to vent from said bag as the foam precursors form foam.

18. A foam in bag precursor according to claim 17 wherein the positions of said seals define the respective sizes of said first and second cells as those that hold the correct proportion of each cell's respective foam precursor.

19. A foam in bag precursor according to claim 17 wherein at least one of said frangible seals is parallel to one of said side edges.

20. A foam in bag precursor according to claim 19 wherein the other of said frangible seals is perpendicular to said at least one frangible seal.

21. A foam in bag precursor according to claim 19 wherein the other of said frangible seals is oblique to said at least one frangible seal.

22. A foam in bag precursor according to claim 17 wherein said first cell is defined by:

portions of two of said four side edges;

said first frangible seal; and said nonfrangible seal.

23. A foam in bag precursor according to claim 22 wherein said second cell is defined by:

portions of two of said four side edges; and said first and second frangible seals.

24. A foam in bag precursor according to claim 17 wherein said venting means is selected from the group consisting of: a puncture opening in at least one sheet of said plastic film material, an unsealed portion in an otherwise sealed edge of said bag, and a portion of said bag formed of a material that is permeable to gases, but that substantially prevents the passage of foam and foam precursors.

25. A foam in bag precursor according to claim 17 wherein one of said closed side edges is a folded edge.

26. A foam in bag precursor according to claim 17 wherein one of said closed side edges is a sealed edge.

27. A foam in bag precursor according to claim 17 wherein said bag material has insulating characteristics that sufficiently moderate the transfer of the heat generated by the reaction of foam precursors to keep the temperature on the outer surface of the bag below the expected pain threshold for human touch as the foam precursors react to form foam.

28. A foam in bag cushion precursor that is particularly useful for manual operation, said cushion precursor comprising:

a bag formed of flexible plastic film material closed on all of its side edges;

a plurality of interior seals that define four interior cells;

a first and second of said cells each containing a respective foam precursor;

a third cell adjacent said first and second cells;

one frangible seal between said first and third cells and a second frangible seal between said second and third cells for permitting the contents of said first and second cells to mix in said third cell when said frangible seals are broken, said frangible seals being formed over a pattern of printed release agent in which said agent prevents said plastic material from heat sealing at a printed portion, so that the amount of printed portions in said pattern determines the strength of said frangible seals; and means for permitting gases to vent from said bag as the foam precursors form foam.

29. A foam in bag precursor according to claim 28 and further comprising a plurality of discontinuous seal lines in said third cell that direct the contents of said cells to mix before the mixed contents enter the remaining portion of said bag.

30. A foam in bag precursor according to claim 28 wherein the positions of said seals define the respective sizes of said first and second cells as those that hold the correct proportion of each cell's respective foam precursor.

31. A foam in bag precursor according to claim 28 wherein said venting means is selected from the group consisting of: a puncture opening in at least one sheet of said plastic film material, an unsealed portion in an otherwise sealed edge of said bag, and a portion of said bag formed of a material that is permeable to gases, but that substantially prevents the passage of foam and foam precursors.

32. A foam in bag precursor according to claim 28 wherein one of said closed side edges is a folded edge.

33. A foam in bag precursor according to claim 28 wherein one of said closed side edges is a sealed edge.

34. A foam in bag precursor according to claim 28 wherein said bag material has insulating characteristics that sufficiently moderate the transfer of the heat generated by the reaction of foam precursors to keep the temperature on the outer surface of the bag below the expected pain threshold for human touch as the foam precursors react to form foam.

* * * * *